Fig. 1.

INVENTOR
FRANK RIEBER, DECEASED,
BY LU GARDA RIEBER, EXECUTRIX.
BY Donald W. Lippincott
ATTORNEY.

INVENTOR
FRANK RIEBER, DECEASED,
BY LU GARDA RIEBER, EXECUTRIX.

BY Donald K. Lippincott

ATTORNEY

United States Patent Office 2,693,862
Patented Nov. 9, 1954

2,693,862

METHOD OF AND APPARATUS FOR DISPLAYING GEOPHYSICAL DATA

Frank Rieber, deceased, late of New York, N. Y., by Lu Garda Rieber, executrix, New York, N. Y., assignor to Geovision Incorporated, a corporation of New York Application October 11, 1948, Serial No. 53,954

10 Claims. (Cl. 181—0.5)

This invention relates to a method of displaying the data of geophysical exploration in such a manner as to make it capable of ready interpretation, and to apparatus for applying said method.

Among the objects of this invention are to provide a method of displaying geophysical data in the form of sections of the geological mass to be explored; to provide a method of varying the hade and azimuth of the sections displayed, so as to give the observer a three dimensional concept of the structure of said mass; to provide a method of displaying seismic geophysical data wherein the observer need make no assumptions as to what portions of the received waves are significant, such portions being self identifying; to provide a method and means for introducing into the display the effect of knowledge, otherwise acquired, of such factors as the velocity of seismic waves at varying depth, the wave length of such waves or other variables, thus minimizing distortions in the display caused thereby, or, in the absence of such knowledge, introducing varying assumptions as to such variables and by determining which of them present a coherent picture the observer can deduce the actual values of such variables; and to provide apparatus for applying the methods above referred to automatically, so that the seismic waves resulting from an explosion effectively paint a picture of a section of geologic structure as they are supplied to the instrument, completing the picture in a few seconds at most.

In all methods of seismic exploration a seismic wave is generated, usually by an explosion, in a known position over the geological mass to be explored and this wave and the reflections thereof are picked up by a plurality of geophones or receptors, whose positions with respect to the mass and the origin of the wave are also accurately known and which convert the received waves into electric currents. Records of these currents are the data from which the geological formations within the mass are derived. Considered broadly, the method of this invention comprises projecting the positions of the points of origin and reception of the wave to scale on a surface representative of a pre-selected section of the mass and generating with respect to the wave origin and each of the receptors a family of curves, each representing, to scale, the locus of any possible formations which would result in the arrival at the receptor of a reflection at an instant corresponding to the position of the locus, and modulating the intensity of each locus (i. e., varying the weight of the curve representing it) in accordance with the intensity of the wave received by the appropriate receptor at that instant. Mutual reinforcement of similarly modulated loci then indicates the position of significant formations.

The nature of the invention will become more clearly apparent by reference to the description which follows and to the accompanying drawings, wherein.

Figure 1:
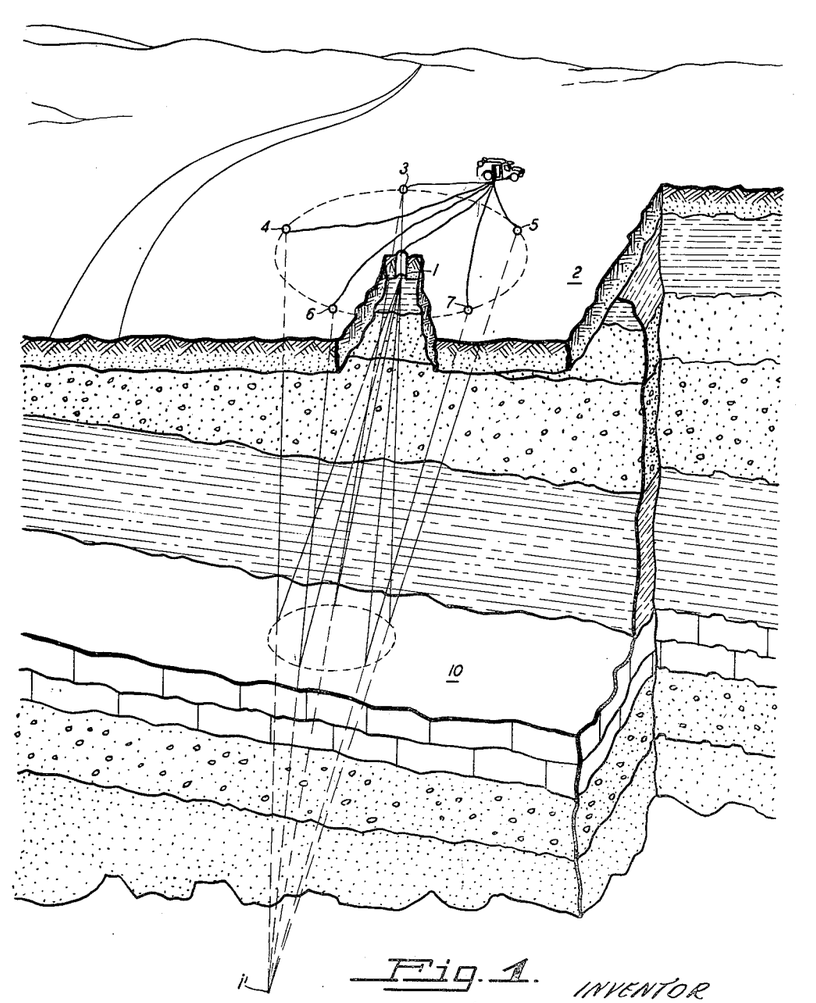
Fig. 1 is a diagram in perspective of a shot-point, and an array of receptors, with respect to a geological mass and a reflecting surface.

In order to understand fully the inventions herein disclosed it will first be necessary to consider the geometry of the reflection method of seismic exploration which will be used as an illustration of the invention. Fig. 1 is intended to represent in greatly simplified fashion a portion of a geological mass which is to be explored. In this representation the shot-point 1 (at which is located a charge of explosive to initiate the seismic wave) is buried some distance below the surface of the ground 2. An array of receptors or geophones, numbered 3 to 7 inclusive, is located either on the surface 2 or buried thereunder, at some distance from the shot-point, the position of each receptor being carefully surveyed and mapped so that its distance and direction from the shot-point is accurately known. In practice the number of receptors would be very much larger than is indicated in the figure.

Somewhere beneath the shot-point and the receptors lies a stratum 10 of different density and rigidity than the material between it and them, this intervening material being cut away in the drawing so that the disposition of the stratum 10 can be shown. For the present it will be assumed that this material is homogeneous, and that the elastic waves generated by the shock travel through it at constant velocity.

When the charge at 1 is fired the wave generated thereby travels out hemispherically until it reaches the stratum 10, at which surface a portion is reflected toward the receptors 3 to 7, which respond thereto to set up corresponding electric waves.

In the commonest method of reflection shooting the electric waves are used to actuate recording galvanometers, one for each receptor, which trace the received wave-forms side by side on a constantly moving strip of paper. A mark on the paper indicates the instant of the explosion, and the distance from this mark to the initial point of the recorded wave gives the time the seismic wave required to travel from the shot-point to the receptor. Knowing the velocity of the seismic wave in the earth we can evaluate from this time the distance traveled by the wave between these points. In general, these distances will be different for each receptor.

Looking at the figure we can say that the waves arrive at the receptors as if they proceeded from the virtual image 1' of the shot-point 1, located on the perpendicular from the shot-point to the stratum 10 as far below that stratum as the shot-point is above. From the seismograph records, however, we can derive distance but not direction, and can say merely that the sum of the distances from the shot-point to the stratum and from the stratum to the receptor is the known distance traveled by the wave.

One definition of an ellipsoid is the locus of points the sum of whose distances from the two foci is a constant. What is obtained, therefore, by laying off on the seismograph record the distance between the firing instant and the first arrival of a reflected wave at any receptor is actually the locus of all possible strata which could cause such a reflection, and this locus is, to a first approximation, an ellipsoid of revolution with its foci at the shot-point and the receptor respectively.

To the extent that the reflection of the wave is truly specular the possible reflecting surfaces must be tangent to the ellipsoid; actually there is usually some slight diffuse or scattered reflection, so that there is a certain amount of reflection received from surfaces making slight angles with the tangent plane.

We can now assume a plane through the earth, project upon it, to scale, the positions of the foci of the ellipsoidal loci, or (what is equivalent) the centers of the ellipsoids, and construct, also to scale, the trace of the intersection of any locus with this plane. The simplest such plane is one containing the line joining the shot point and the receptor, in which case the trace is an ellipse, the sum of whose distances from the foci are taken from the seismogram. With a number of receptors on the same line a number of ellipses will be obtained, with different centers, eccentricities or both, which intersect each other in much the same manner as engine turned engraving, and like such engraving reinforce each other where their arcs are nearly parallel, at the point of intersection, to draw a short, quite clearly defined line at a distance from the center corresponding to the distance of the reflecting surface. The general appearance of such intersections is indicated (although with circular arcs, as will later be explained) in Fig. 4.

Where all of the receptors are on the same line in or parallel to the projection plane its selection involves only its strike; i. e., the azimuth of its intersection with the plane of the horizon. The intersections of the loci give the distance and dip of the intersection of the reflecting surface with a plane having the selected strike, but no information as to the hade or angle with the vertical of such plane. For the latter information additional receptors, out of the projection plane, are necessary.

To project the position of such receptors onto the display surface a hade must be assumed for the projection plane. If it is assumed to be vertical the projections of the centers of the loci will lie on the same line in the plane as the in-line receptors, but if the plane is assumed as having a hade other than zero the off-line receptors will be above or below the shot-point receptor line.

Figure 5:
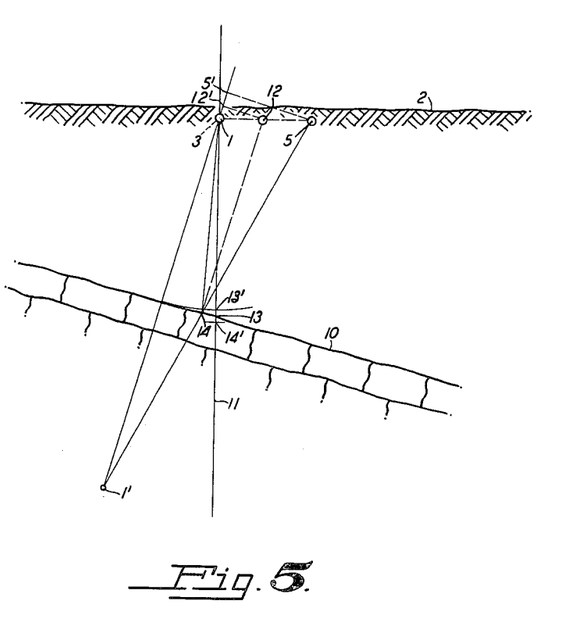
Fig. 5 is a diagram illustrating the projection of the shot and receptor points onto an assumed picture plane, the plane of the diagram being normal to the line joining the shot point and one receptor.

The procedure and resultant effects are illustrated in Fig. 5, which may be considered as illustrative of a cross-section through the formation shown in Fig. 1, taken in a plane perpendicular the line joining the shot point 1, and the receptor 3, only the geometrical positions of the various significant features being shown.

In Fig. 5 the reference character 1 indicates the shot point as before, the receptor 3 being directly behind it. The geophone 5 then appears in the position as shown. The line 11 represents the intersection of one possible picture plane with the plane of the figure, and the reference character 10 designates the position of the reflecting surface. The point 12 is the center of the elliptical locus of reflections received at the receptor 5.

It will be apparent that if the projection plane is chosen vertical, as at 11, the points 5 and 12 will be projected on the display surface representing it on the same line as points 1 and 3; i. e., behind point 1 in Fig. 5. The locus generated about points 1 and 3, and its intersection with loci about other foci (not shown) actually on the same line will not indicate the actual distance between the line 1—3 and the point 13 where the stratum 10 intersects the assumed plane, but, instead, will show a reflection occurring at one-half the distance between the shot point 1 and its image 1', namely, at a distance corresponding to that of the point 13'. Similarly, the locus constructed on points 1 and 5 will appear at a distance from the line 1—3 equal to the distance from the center of the locus corresponding to the distance 12—14, or as if it were at 14'. There will be no intersection or reinforcement of the loci generated about points 1—3 and 1—5 respectively. The effect is much as though the loci had been projected on separate parallel transparent planes containing the lines 1—1' and 12—14 respectively, and the planes had then been swung about the centers 1 and 12 into vertical positions and viewed horizontally.

If the assumed projection plane were given a hade, however, to make it coincide with the line 1—1', the projections of points 5 and 12 on this new plane would be at points 5' and 12' respectively, and the loci generated upon them would reinforce those generated upon points 1 and 3. The projections of the other receptors shown in Fig. 1 would form an ellipse upon the display surface and all the loci would reinforce.

It will be understood that in constructing the off-line loci their foci or centers are projected on the assumed plane and the coordinates of the loci are modified in accordance with the angle between the receptor azimuth and the strike of the plane of projection, e. g., the horizontal coordinates are multiplied by the cosine of the angle between the strike of the projection plane and the line joining shot point and receptor.

It will be apparent that if the projection plane were taken normal to that assumed for the plane in Fig. 5 whose trace is the line 11, i. e., if the projection plane were taken parallel with the plane of Fig. 5 itself, the display would resolve without the necessity of hade. As will be shown hereinafter there are procedures for causing an apparent rotation in azimuth of the picture plane, and frequently it is advantageous to use this latter procedure rather than to give the projection plane a hade.

Further, it should be apparent from what has been said that there is complete freedom of choice as to the picture plane, as it is only for convenience that we have made it include the line defined by any of the foci.

Thus far several assumptions have been made, the first being that we have pre-selected the significant point of first arrival of a reflection from each of the seismograms. Instead of this we may consider every point on each seismogram as significant, and generate with respect to each pair of foci an entire family of closely adjacent loci, distinguishing them by modulating them in intensity in accordance with the instantaneous value of the seismic wave at the instant corresponding to the locus. This will fill the entire picture plane with intersecting and re-intersecting loci. The values of modulation of the different loci at most points of coincidence will be of varying phase, and the general plane therefore tends to assume an average intensity. Where actual coincidences occur, however, the modulations reinforce and give a degree of contrast with the average which is (to a first approximation) proportional to the square root of the number of receptors used.

If geological masses were as simple as that shown in the figure, or if the seismic waves comprised only a single pulse, what has been described above would be enough to give the necessary information. Actually, it is only more complex formations such as stratographic traps, faults and folds, that are of interest. Furthermore, the effect of the explosion is not a single pulse, but a damped wave of complex form, frequently including many non-harmonic components; as received by most equipment, which includes filters for removing frequencies which are merely confusing, the decrements of these components are small. Therefore, the first arrival from the stratum 10 will be followed by a rather long train of waves on which will be superposed both the unreflected wave arriving directly along the surface and other reflected waves from deeper or more distant strata. These other arrivals are random in phase, although their component frequencies will be much the same. Major discontinuities in amplitude are apparent, as in the case of ordinary seismographic analysis, but more valuable detail can be recognized by emphasizing the initial impulses of successively arriving reflected wave-trains, which may be accomplished to some degree in the manner next to be described.

In a seismogram made without the use of filters the complexity of the resultant wave is such that no periodicity may be apparent. The higher frequencies tend to damp out in the earth more rapidly than the low ones, and the useful frequencies may be taken as those between about 25 and from 100 to 200 cycles per second.

Frequencies outside of this range are generally more confusing than useful, and are usually filtered out, often together with a portion of the band mentioned. As the pass band of the filters used is narrowed a periodicity often becomes apparent in the recorded waves, even though the filters may pass a reasonably wide band—on the order of an octave, though sometimes much less—and have not sharply resonant characteristics.

For maximum usefulness with the present invention the filters used should have as wide a pass-band as is compatible with the passed wave displaying a clearly marked periodicity. The actual band width used to accomplish this depends on the nature of the soil in which the shot is placed, the size of the charge, the nature of the explosive, and possibly other factors.

Each of the components of the seismic wave is damped. Where the components passed by the filters show a definite periodicity the resultant wave is also damped, and a seismic record will have an effective wave length, lambda (not to be confused with its wavelength in the earth, which may be a variable), and decrement, delta.

If, after passing the filters, the wave is divided, one half is delayed for one-half period and attenuated by the decrement, and the undelayed and delayed halves are then recombined, the initial impulses of the arriving reflections are accentuated in comparison with the succeeding wave trains. This process may be referred to as the "lambda-delta correction." If the pass-band of the filters is broad enough and related to the component frequencies of the wave so that the build-up time of the wave is small in comparison with its time of decay, the pattern on the display surface can be greatly simplified and clarified thereby, and even the lambda correction alone can give good results in this connection.

Thus far it has been assumed that the loci of reflection have been truly ellipsoidal. This would be true if the velocity of the seismic waves were constant, which can never be the case, for the fact that reflections occur is dependent on change of velocity as between strata. In general there is an increase in velocity with increasing depth, and this causes refraction; a bending of the wave paths which distorts the ellipsoids. The effect of this is greater with increasing depth. Near the surface the ellipsoids obviously have a large eccentricity in a horizontal plane. As the radii increase the loci approach more and more nearly a spherical form, even under constant velocity conditions, but where the velocity increases with depth the vertical dimensions increase, and so do the deeper horizontal components. The result of this is to make the loci approach a spherical form much more rapidly than under constant velocity conditions.

The actual rate of change of velocity with depth is seldom known, and is difficult to express by formula since it is subject to discontinuities where the waves pass an interface between strata, as well as gradual increases where strata are more compacted with increasing depth. In the initial stages of an exploration the best that can be done is to assume a formula for rate of change of velocity which ignores discontinuities and expresses the average slope of the velocity-depth curve. One such formula, which has been used quite extensively and with considerable success, is $V=V_0+KD$, where V is instantaneous velocity, $V_0$ is initial velocity, D is depth and K is an experimental constant. It should be noted that D is, in general, to be taken in the direction of the velocity gradient, and that, particularly where the strata are tilted, it may not be perpendicular to the surface, but either perpendicular to the dip or at some intermediate angle.

Where this formula obtains the wave fronts remain spherical in form, but the spherical surfaces corresponding to the successive positions of any such wave front are no longer concentric; the centers descend along a line in the direction of D at a rate depending on K.

The effect of this distortion of the wave fronts is to decrease the eccentricity of the loci and make them approach sphericity more rapidly than would be the case in a homogeneous medium. The velocity may vary between wide limits, depending both on the depth and the nature of the soils or rocks through which the wave is propagated; from 5,000 to 14,000 feet per second is the approximate range.

One way of considering the loci of possible reflecting surfaces, as they appear on the display surface, is to think of them as modified circular arcs, originally centered on the mid-points between the shot-points and the various geophones. Such arcs can be plotted in Cartesian coordinates, and corrections applied thereto; one correction (which decreases rapidly with increasing radius) for converting the circular arcs into elliptical ones, and a second correction, which increases with increasing radius, for moving the center in accordance with the increase of velocity with depth.

These corrections can be applied separately. The velocity correction tends to mask the elliptical correction, and the latter quickly becomes negligible in comparison with the former, and at depths of the order of magnitude of the separation between receptors and shot-point the elliptical correction can no longer be clearly recognized. Since, as has been pointed out, the velocity correction need be approximate only, since deep formations are in general of more interest than shallow ones, and since reflections from shallow structures are frequently masked by surface waves, it is usually satisfactory and often advisable to omit the elliptical correction. This is done in the apparatus to be described, methods of applying the elliptical correction being covered in copending application Serial Number 65,833 filed December 19, 1948.

It will be apparent that to plot geophysical data by hand in the manner described above would be an extremely tedious process, and would, moreover, be susceptible to errors owing to the fact that each significant wave front would have to be applied to an individual locus which must, to some extent, be individually computed. One aspect of this invention is that it provides means for generating on a screen or display surface traces corresponding to successive loci and for modulating these traces by waves received from the geophones to which these traces appertain.

Figure 2:
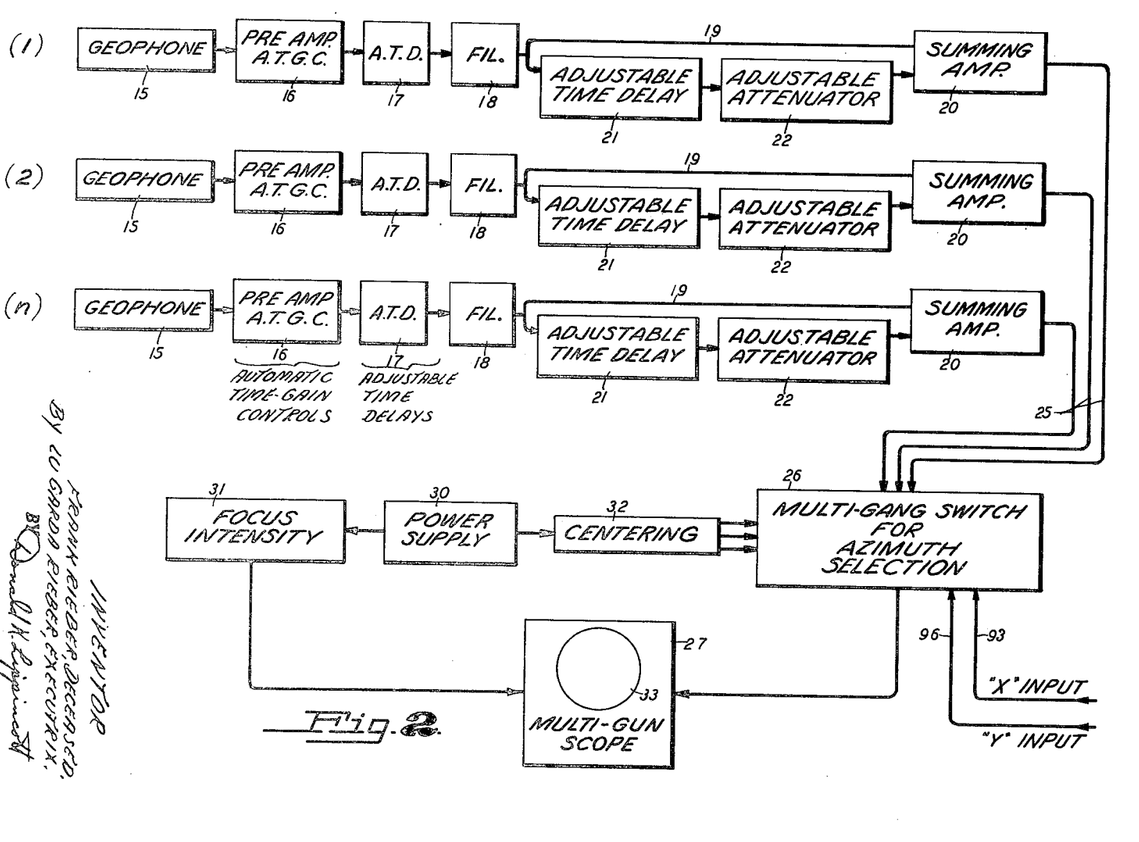
Fig. 2 is a block diagram of geophone and auxiliary circuits connected to display seismic data on a multi-gun cathode ray tube.
Figure 3:
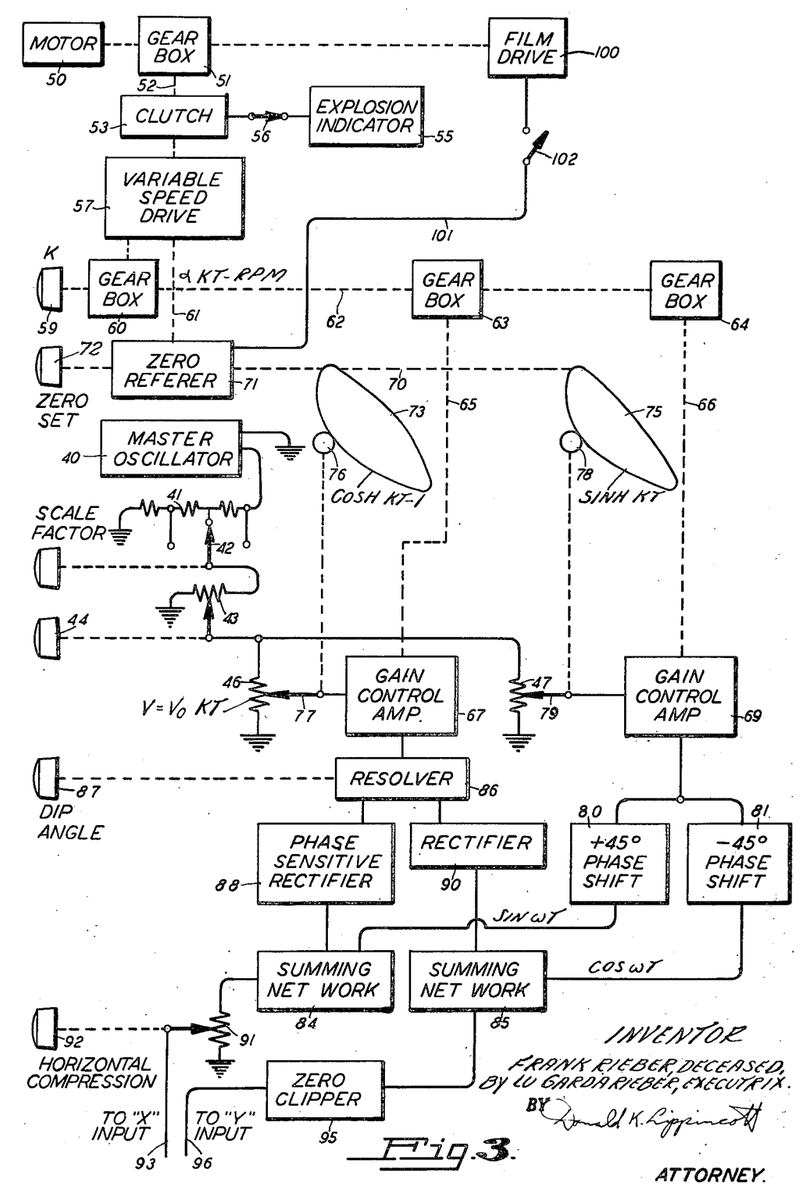
Fig. 3 is a schematic diagram of a deflection system for generating on a cathode ray screen successive loci corresponding to the terrestrial positions of possible reflecting surfaces.

The embodiment of this invention here chosen for illustration uses, as the display equipment, a multi-gun cathode ray tube, provided with separate modulating and deflecting circuits for each electron gun. Such tubes have been designed with up to twenty-four electron guns, and are regularly advertised with as many as twelve guns, each provided with a grid for modulating the beam therefrom and with its own deflecting system. Each grid is fed with the output of a single geophone. Fig. 2 illustrates, in block form, the modulating, focusing, and centering circuits; Fig. 3 illustrates the deflecting circuits for generating the loci. It will be understood that in Fig. 2 only representative circuits are shown, and that the elements of these circuits are repeated for each geophone used. The equipment here described is particularly adapted for use with a circular array of geophones disposed about a central shot point, but it may be adjusted to operate with any number of geophones up to its total capacity, disposed in any array whatsoever.

Considering Fig. 2, each geophone line $(1)(2) \ldots (n)$, comprises a geophone 15 which feeds into an automatic time-gain-control preamplifier 16. These automatic time-gain-control amplifiers are now well known in the geophysical art, and increase the amplifier gain with time in order to compensate for the greater attenuation of waves arriving from more distant reflecting surfaces. Following the preamplifier in each circuit is an adjustable time-delay circuit 17, which is used to apply the "weathering correction" which compensates for irregularities due to weathering of the surface layer of the overburden of the area to be explored. The methods of computing and applying such weathering corrections are well known and need not be considered in detail here.

The filters 18, above referred to, are preferably inserted in the lines following the time-delays 17, thereafter each geophone circuit splits. One branch 19 connects directly to a summing or mixing amplifier 20. The other branch leads first through a second adjustable time-delay circuit 21 for applying the lambda correction; i. e., for delaying the wave by an amount equal to one-half period of its fundamental frequency. From thence the circuit leads to an adjustable attenuator 22 for applying the delta correction. From this latter attenuator the branch circuit leads into the summing amplifier 20, which recombines the two branches of the circuit, so that the output circuit contains primarily only the initial impulses of each arriving train of waves.

The output channels 25 from the summing amplifiers connect to a multi-gang switch 26. Through this switch each of the geophone circuits can be connected to any of the electron guns of the multi-gun cathode ray scope 27. Thus, if for the moment the geophones be designated as A, B, ... M, N, and the guns as $a, b, \ldots m, n$, geophones and guns can be connected in combinations $Aa, Bb, Cc, \ldots$, or $An, Ba, Cb, \ldots$, or any other combination in which the geophones and guns appear in their regular order. By this means, when the geophones are in a circular array, and the traces of the cathode ray beam are projected upon the screen in their proper undeflected positions, by rotating the switch the plane of projection of the geophysical mass which we wish to explore can be rotated without further adjustment.

A power supply 30 is provided, of conventional type, which supplies the necessary D. C. potential for all of the cathode ray guns. These potentials are fed, respectively, to a voltage divider or other means 31 for providing the proper potential for the anodes of all guns, and to a voltage adjuster or centering device 32 which feeds through the multi-gang switch the proper potentials for centering the individual beams from the guns at the proper points on the screen 33 to represent, to a selected scale, the projections of the mid-points between geophone positions and the shot-point in their proper positions with respect to the selected plane of section through the geological mass to be explored. These midpoint positions will hereinafter be referred to as the origins of the loci; they are fixed points of reference, although the centers of the loci move.

The tube 27 is also supplied, either through the multi-gang switch 26 as shown, or directly, with oscillating scanning potentials derived from the equipment illustrated in Fig. 3 or other equivalent apparatus.

It should be noted here that although the equipment has thus far been described as having the geophones directly connected to the oscilloscope, so that the progress of the seismic waves is developed upon the cathode ray screen as they arrive, this need not necessarily be the arrangement used. The waves may, instead, be phonographically recorded, as described in my previous Patents Nos. 2,144,812 and 2,051,153, and the phonographic records may be played back into the display equipment at a later time and as frequently as may be desired.

The chain from the geophone to the cathode ray tube can be broken for the insertion of the recording and reproducing equipment at any point. Practically, however, if phonographically recording the waves is to be resorted to, the best place to make the record is immediately following the weathering correction time-delay circuit 17. The automatic time-gain-control is always arbitrarily preset, and the weathering correction is individual to each geophone and is known and set in advance. Both the lambda and the delta corrections, however, may vary with soil, size of the charge fired, and various other factors, and hence, if the record is made before these corrections have been applied to the wave, they can be found by trial and error instead of by estimate and computation, the record being replayed until the best values for filter pass band and lambda and delta have been achieved. The scanning equipment diagrammed in Fig. 3 can be used either with waves directly from the earth or from the multiple phonographic records carrying, in parallel, the output of all of the geophones used.

The purpose of the equipment illustrated in Fig. 3 is to sweep or scan the various cathode ray beams across the display surface of the tube in arcs representative of the intersections or traces of the various spheroidal loci with the desired projection plane or with planes parallel thereto. In using a multi-gun tube magnetic deflection of the cathode ray beams, although not impossible, is impractical. For best delineation of the geological mass to be explored a number of loci should be traced for each wave length of the seismic wave. It has already been pointed out that the loci may be considered as spherical surfaces to which correction factors have been applied. The intersections of these loci with the projection planes will also, therefore, be circles, more or less modified by the correction factors. The scanning therefore can be accomplished by generating a substantially pure harmonic frequency of suitable value, applying sine and cosine phase components of this frequency to the vertical and horizontal deflecting plates of the various electron guns, and varying the amplitudes of these components in accordance with the suitable laws to cause the radius to which the beams are deflected to follow the appropriate paths.

The frequencies which are most valuable for seismic exploration lie, in general, between 25 cycles per second and 100 cycles per second. The time following the initiation of the seismic shock during which significant reflections are of sufficient amplitude to be clearly recognizable does not exceed four or five seconds. Within this time from 100 to 500 complete cycles of the significant waves can be recognized. There should be a reasonably large number of loci traced for each wave length of the seismic wave, say from 10 to 20 at a minimum. The frequency of scan should therefore be at least 2,000 cycles per second. If recorded waves are to be analyzed it is quite possible to run the playback at a much higher speed than that at which the waves were originally recorded, and if this is done the scanning frequency should be correspondingly higher. The scanning frequency may be as high as desired; there is no reason why it cannot be carried up into the megacycles. Resolution will not increase correspondingly, however.

The basic scanning frequency is developed by a master oscillator 40, which is preferably controlled to give constant frequency and constant voltage. Preferably this voltage is several times that required to give full scale deflection of the cathode ray beam. The output of the oscillator is fed into a voltage divider 41, whereby, by means of a switch 42, the basic scale at which the presentation is to be made can be set. For the deepest explorations the switch 42 would be set to minimum voltage, so that after the final operations thereon the deflection would just fill the screen of the scope. For shallower explorations a higher voltage would be used, so that the growth of the scanning radius would be more rapid, the entire screen would be swept in a shorter period, and the picture of the shallower strata would be shown to a larger scale with the detail, consequently, more evident.

The potential derived from the switch 42 is fed through a potentiometer 43 for setting the initial rate of growth of the scanning radii; i. e., the setting of this potentiometer, by means of the knob 44, is dependent upon the value of $V_0$ in the area to be explored.

The voltage divider 41 and potentiometer 43 both operate to vary the voltage derived from the oscillator. By calibrating the divider 41 in fixed "scale" increments, however, multiple calibrations reading directly the initial velocities can be provided in connection with the knob 44, which simplifies making the analyses.

The basic oscillating potential corresponding to $V_0$ is fed from the potentiometer 43 to two other potentiometers 46 and 47. The contact arms of these two potentiometers are mechanically driven in such manner as to modify the scanning potentials in such manner as to cause the beams to trace the desired loci as they vary with time.

It has been pointed out that the velocity formula $V = V_0 + KD$ is perhaps the most generally useful one in explorations of the type contemplated. It can be shown that where this formula obtains $$R = \frac{V_0}{K} \sinh Kt$$

and $$Z_d = \frac{V_0}{K} (\cosh Kt - 1)$$

In this formula R is the radius of the circular traces, and $Z_d$ is the distance to which the center of the circle is depressed below the point of origin. The radial deflection can, of course, be developed by applying sine and cosine phase components of the oscillating frequency to the vertical and horizontal deflecting plates of the guns respectively. $Z_d$ is a slowly increasing unidirectional potential applied to the vertical deflection plates where D is taken normal to the earth's surface, or with components applied to both vertical and horizontal plates where the velocity gradient deviates from the vertical. Both R and $Z_d$ functions involve both $V_0$ and time, as well as the gradient constant K. The potential corresponding to $V_0$ is operated upon by the potentiometer 46 in order to develop the $Z_d$ potential. It is operated on by the potentiometer 47 in order to develop the R function. The mechanical drives to provide these operations are shown at the top of Fig. 3.

The primary drive of the mechanical equipment is provided by a constant speed motor 50 which operates through a gear box 51 to drive a shaft 52 in which a clutch 53 is interposed. The clutch is engaged by an impulse from the explosion indicator 55 if the waves are taken directly from the earth. In this case switch 56 is closed and the same impulse that fires the shot operates to release the explosion indicator and start the operation of the device. The shaft 52 operates a variable speed drive 57, which is a continuously variable friction gear. The speed of the variable drive is selected by means of a knob 59 operating through a gear box 60.

Considered mathematically, the constant rotation of the motor shaft and the shaft 52 as driven by the clutch represent the constant advance of time $t$. The knob 59, selecting the speed of the drive, selects the constant K, so that the output shaft 61 rotates at a speed proportional to the quantity $Kt$. The knob 59, operating through shafts 62 and gear boxes 63 and 64 and mechanical connections 65 and 66 also operate to control the gain of amplifiers 67 and 69 as a function of K, as will be described later.

Shaft 61 drives a shaft 70 through a zero referrer 71. This is simply a clutch, operated by a knob 72, whereby the shaft 70 may be set to its zero position prior to the operation of the device.

Mounted on shaft 70 are two cams, 73 and 75. Cam 73 is so cut as to drive its follower 76 in accordance with the function $(\cosh Kt - 1)$, this follower being connected with the contact arm 77 of the potentiometer 46. Cam 75 drives its follower 78 in accordance with the function $\sinh Kt$, and operates the contact arm 79 of potentiometer 47.

Contact arms 77 and 79 are connected, respectively, to the inputs of gain-control amplifiers 67 and 69. As above mentioned, the gain of these amplifiers is set by means of the knob 59 as a function of the constant K; specifically, so that the gain is proportional to $$\frac{1}{K}$$

The output of amplifier 67 is therefore proportional to the quantity $$\frac{V_0}{K}(\cosh Kt - 1) = Z_d$$

while that of amplifier 69 is proportional to $$\frac{V_0}{K}\sinh Kt = R$$

these being the two quantities entering into the definition of the loci.

Considering first the output of amplifier 69, it is fed into two phase-shift networks 80 and 81, the first of which advances the phase of the oscillations fed into it by 45 degrees, while the second retards the phase by 45 degrees, so that their outputs become, respectively, the sine and cosine phase components required to deflect the beam into the circular loci. These outputs are fed respectively into two resistive summing networks 84 and 85, where they are added to the unidirectional components developed from the output of gain control amplifier 67.

The amplifier 67 feeds into a resolver 86. The function of the resolver is to take account of the direction of the velocity gradient so that the motion of the center of the deflection radii will coincide therewith. It comprises an oscillation transformer with two secondaries set at right angles to each other. The angles of the secondaries with respect to the primary may be set by means of a knob 87. When the gradient is vertical one of the secondaries will be at right angles to the primary, and will pick up no component of the oscillating potential fed to the resolver by the amplifier 67, while the other secondary will pick up full voltage from the primary. The angle of the first-mentioned secondary to the primary is set normal to the velocity gradient, and as a result the output of this secondary is equal to the sine of the angle of deviation, whereas the output of the other secondary is proportional to the cosine.

The sine function is fed into a phase sensitive rectifier 88; i. e., when the angle of deviation from the vertical is "positive" the rectifier feeds a positive potential to the summing network 84, whereas a "negative" angle leads to a negative potential being fed to this network. As a result, the center of the radii of deflection of the various cathode ray beams will move progressively as the function $(\cosh Kt - 1)$ increases to the right when the deviation is positive or to the left if the deviation is negative.

Figure 6:
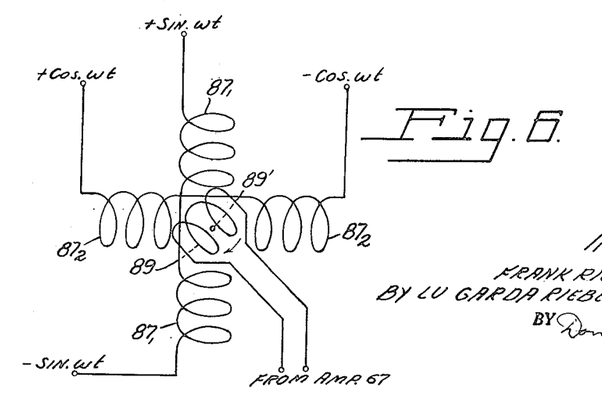
Fig. 6 is a schematic diagram of a resolver of the radio goniometer type.

Probably the best known type of resolver is the "radio goniometer" which has been used for many years in radio direction finding equipment. As illustrated schematically in Fig. 6 it comprises two coils, or, as illustrated, two pairs of coils $87_1$ and $87_2$, whose fields cross at right angles. A movable coil 89 is mounted on a shaft $89'$ for rotation within the coils $87_1$ and $87_2$ if single coils are used, or between them, as illustrated, in the case of pairs of coils. As will be seen, if coil 89 is turned so as to be coaxial with coils $87_1$ it will be completely decoupled with respect to coils $87_2$, while a ninety degree rotation will reverse this situation and intermediate positions will couple with coils $87_1$ and $87_2$ proportionally, respectively, to the sine and cosine functions of the angle of rotation. In the present case amplifier 67 feeds coil 89. Other types of resolvers which may be used are the so-called sine and cosine potentiometers which have been widely used in radar equipment for the resolution of signals into components whose amplitudes are proportional to the sine or cosine functions.

A widely used type of phase-sensitive detector is that employed in many television receivers for synchronizing the horizontal or line scanning circuits. This particular type of equipment is illustrated in the operating manuals provided with such means of synchronization, and in many other publications. In construction and operation are described, for example, in "Television, How It Works," John F. Rider Publisher, Inc., 1948. A circuit diagram of the device is shown in Fig. 8—8 of this publication, page 148, and its operation is described on page 150 thereof. In this device the signal to be discriminated is fed in opposite phases to a pair of rectifiers and thence to a pair of resistors, while a comparison voltage is applied to both rectifiers in parallel, ninety degrees out of phase (at the critical or comparison phase) with the voltage to be discriminated. The voltage drops across the two resistors cancel at the exact ninety degree point. Any rotation of phase of the discriminated signal from the ninety degree relationship causes a component of the comparison signal to add to one and subtract from the other, resulting in a voltage which depends in sign and magnitude upon the angle of phase displacement.

The cosine component from the resolver is fed to an ordinary rectifier 90 and thence to the summing network 85, where it is added to the sine function of the oscillating potential in such phase as to progressively depress the center of the radius of deflection. The output of the summing network 84 feeds through a potentiometer 91, adjustable by knob 92, through leads 93 to the horizontal deflection plates of the oscilloscope, the potentiometer serving to equalize the sine and cosine components and hence the vertical and horizontal deflections, or to compress the horizontal component if an exaggerated vertical scale is desired.

The output of the summing network 85 is fed through a zero clipper 95 to the vertical deflection plates. The zero clipper may be a diode connected across the output in such sense as effectively to short-circuit "positive" swings of the deflecting potential. The clipped oscillations feed through lead 96 to the vertical deflecting plates. The origins of the loci are always at or near the line corresponding to the surface line of the earth, and deflections above this line would only be confusing. By clipping the potentials which would deflect the beams above the surface line the rays are forced to trace a line corresponding to the earth's surface, which adds legibility to the diagrams traced by the rays.

It is frequently preferable that the cathode ray oscilloscope used for the display have a persistent type screen, whereon the trace of the rays remains visible for a considerable period. Where the loci are traced directly from the earth waves, as has just been described, the procedure would normally be to photograph the face of the oscilloscope as the shot is taken, so as to make a permanent record.

When it is desired to operate the device from phonographic recordings of the seismic waves, the switch 56 is open, disconnecting the explosion indicator 55. For various reasons variable density records on film have proved to be the most satisfactory type of recording. One of the advantages of this type of record is that the film can be formed into a loop, so that the record can be played continuously and repeatedly, and the pattern formed on the oscilloscope can be studied without photographing it. In order to do this the shaft of the motor 50 is extended through the gear box 51 and utilized to drive the film or other record through the drive mechanism 100. The mark on the film indicating the moment of explosion is used to initiate a pulse in the lead 101 (the switch 102 being closed) which operates the clutch in the zero referrer 71, starting the cams 73 and 75 from zero simultaneously with the arrival of this pulse. Enough of a "trailer" is used on the film so that the cams always complete a full revolution before the record starts to repeat. The shaft 70 then stops until it is picked up again by the next starting pulse. This type of drive is frequently used in facsimile equipment.

It is not necessary that the film records be run at the same speed at which they were taken. There is frequently considerable advantage in speeding them up several fold, and the gear box 51 may be so constructed as to increase the speed of both the film drive 100 and the variable speed drive 57. If both low and high speed drives are to be used, the master oscillator 40 should operate at a frequency high enough to give the required number of loci even at the higher speed. Otherwise the apparatus works precisely as in the case of the direct display.

Figure 4:
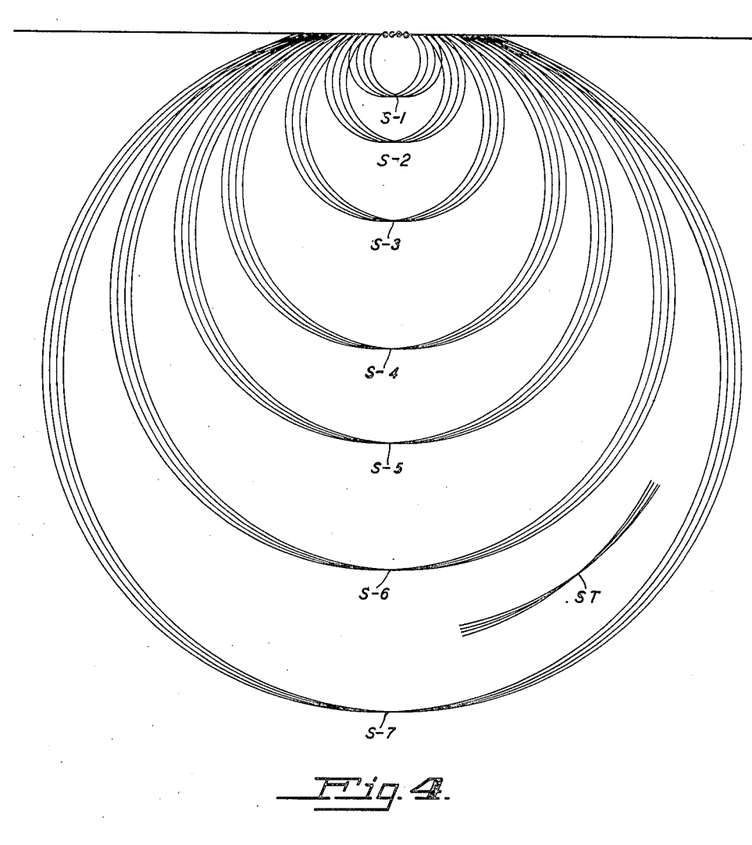
Fig. 4 is a diagram illustrating the appearance on a display surface of loci modulated by waves from various reflecting strata in a medium wherein their velocity of propagation varies directly with depth.

Fig. 4 is a diagrammatic representation of the face of the scope 33, showing the appearance of a number of loci modulated by reflections from various strata. The substantially complete circles indicate loci modulated by reflections from a plurality of horizontal strata, these strata being indicated by the mutual reinforcement of the loci designated as S–1, S–2, etc. The incomplete arcs at ST show a reflection from a single tilted stratum. In the case of the horizontal beds the modulating waves arrive at the geophones at substantially the same time, and the reinforcing circles are all of the same diameter. In the case of the tilted bed shown at ST, the reinforcing circles are of different diameters.

When using the phonographic recordings it is possible for the operator to introduce different data or assumptions into the operation of the device. Such adjustment of the lambda-delta correction has already been referred to. In addition, as the display is repeated the operator may, for example, vary the knob K. If the original assumption as to the variation of velocity with depth is wrong there may be no recognizable reinforcement by the various loci, whereas a different value of K will give a coherent picture. The result, when looking at the display, is very similar to the effect when focusing a camera. A correct assumption as to the value of K will cause the picture to come into focus.

It should also be apparent that by varying K it is possible, in certain portions of the display, to obtain the result which would be evident if some other law of change of velocity with depth were the true one instead of that which was assumed. The potential actually applied to the sweep circuits is not itself either K or $V_0$, but it is an integrated function. If, for a small area of the display surface, the value of K is so chosen that the integrated value is equal to the integrated value of the true velocities down to the corresponding level, that portion of the display will come out clearly.

In like manner the values of $V_0$ and of the angle of velocity gradient can be changed and their effect noted. Moreover, by manipulating the multi-gang azimuth switch, or, alternatively, by making individual adjustments in the projected initial positions of the various beams, the effective plane of the picture section may be rotated through the entire circle. When the plane is so chosen as to be perpendicular to the strike of the strata the loci corresponding to all of the geophones, both within and without the base plane, will reinforce, making the entire picture much clearer. It is also possible to apply the potentials to the vertical deflecting plates which will give a hade to the picture plane. Rotation of the plane in azimuth, however, is generally more desirable, and is what is here shown, since a picture plane normal to the strike of the beds will give all the information that a haded picture plane will give.

With the various adjustments here described available, a skilled geologist may introduce into the display various factors which he either knows from previous experience of the territory to be explored, or which he believes to be reasonable in view of the general geology of the area. Ordinarily the seismologist makes such assumptions once and for all. These assumptions may or may not correspond with the actual fact. It is seldom that the auxiliary data, whether assumed or actually known, are entirely independent. To take an extreme case, for example, it is conceivable that the equipment might be used to detect faults in a structure of otherwise solid granite. In this case the initial velocity $V_0$ would be very high, whereas K would be small. On the other hand, sedimentary formations, particularly those having relatively uncompacted and loose surface layers, will have a low initial velocity and a large value of K. The assumption of a large initial velocity and a large value of K would therefore, ordinarily, be mutually incompatible. The choice of completely wrong functions of this type might, conceivably, give a coherent picture, but the geologist would naturally view this with suspicion and would seek for another combination of parameters more in accordance with the facts as he knew them. Ordinarily, when he had found what he believed to be the most probable set of conditions, he would photograph the face of the scope to preserve the record for comparison with records from adjacent sections.

Various other manipulations are possible whereby the mass can be studied in even greater detail. By means of the lambda-delta correction, which emphasizes the initial impulse, much information can be obtained about the actual nature of the strata encountered. For an initial study, the intensity of the cathode ray beam can be set at a mean value, so that (assuming the initial impulse is compression and the amplifier is so phased) the modulation will increase its brilliancy if the reflection is caused by the wave striking an interface between a lighter and a denser stratum, giving a bright line, or will be reversed in phase and give a dark line where the wave passes from a denser to a lighter stratum. In territory where the reflections are of small magnitude and large in number there may be some apparent overlapping and confusion. Under such circumstances the bias on the modulating grids of the electron guns may be made sufficiently negative so that the beams are normally almost entirely cut off, and will show bright lines only where the waves pass from light to heavy strata. With the same condition, the polarity of the modulations may be reversed and a second set of observations made only where the waves are reflected with reversal of phase. Each of these sets of conditions may be photographed with a single setting of the camera. The superposed negatives will reveal information which would otherwise not be apparent. The reflection with reversal of phase is a particularly important one, since it may well mark an interface between a bed of heavy shale and an oil sand.

It is to be understood that the particular mechanism here described for introducing the scanning parameters is only one of many that may be used. Electronic methods of developing almost any mathematical function are available and are well known in the art, and could be equally well used if it were considered desirable from an engineering standpoint. The equipment here chosen for illustration is used because a mechanical drive is convenient for the phonographic records, and it offers a simple and readily understandable method of developing the necessary functions. In detail, however, the equipment described is illustrative and should not be construed as limiting. It is desired that the invention be construed as broadly as possible within the scope of the following claims.

What is claimed is:

1. Geophysical display apparatus comprising a cathode ray tube having a display screen adapted for excitation by cathode rays developed therein, means for centering a beam of cathode rays on each of a plurality of positions on said screen corresponding to scale with the projections on a predetermined section of a geological mass of the origins of the loci of reflection of seismic waves in said mass as received at a plurality of locations, means for deflecting the cathode rays about each of said positions in closely adjacent quasi-circular paths of expanding radius corresponding with the loci within said section of possible formations which would reflect a seismic wave to the corresponding location at the epoch of said locus, and means for modulating the intensity of the cathode rays tracing said paths in accordance with the intensity of seismic waves received at the respective locations, whereby like modulations of rays tracing intersecting paths are additive to give definite indications of reflecting surfaces, whereas non-coincident modulations tend to equalize.

2. The method of presenting geophysical data on a display surface with scanning means movable over said surface to produce a visible trace of variable weight thereon which comprises the steps of generating seismic waves in a geological mass, collecting impulses representative of said waves as received at a plurality of locations distributed over said mass, centering said scanning means on said surface at each of a plurality of positions corresponding to scale to the origins of loci of reflection of said seismic waves as received at said locations, deflecting said scanning means over said surfaces about said origins in arcs of expanding radius corresponding to said loci at successive intervals following the initiation of said waves, and varying the weight of said trace in accordance with variations in the impulses received at the corresponding locations at corresponding intervals.

3. The method of presenting geophysical data on a display surface with scanning means movable thereover by electrical deflection to produce a visible trace of variable weight thereon which comprises the steps of generating seismic waves in a geological mass, collecting impulses representative of said waves as received at a plurality of locations distributed over said mass, centering said scanning means on said surface at each of a plurality of positions corresponding to scale to the origins of loci of reflection of said seismic waves as received at said locations, generating an electrical wave of a frequency materially higher than the fundamental frequency of said seismic waves, applying sine and cosine phase components of said electrical wave to deflect said scanning means over said display surface in arcuate paths, modulating said components to cause said paths to correspond to said scale to the traces of said loci on a section through said mass at successive epochs following the initiation of said seismic waves, and varying the weight of said trace in accordance with variations of said impulses received at the corresponding location at corresponding epochs.

4. The method in accordance with claim 2 which includes the steps of generating electrical waves corresponding to said seismic waves as received at each of said locations, dividing said electrical waves into two portions, delaying one of said portions for an interval substantially equal to one-half period of the fundamental frequency thereof, recombining said portions, and varying the weight of said trace in accordance with variations in the combined waves.

5. The method in accordance with claim 2 which includes the steps of generating electrical waves corresponding to said seismic waves as received at each of said locations, dividing said electrical waves into two portions, delaying one of said portions for an interval substantially equal to one-half period of the fundamental frequency thereof, attenuating said delayed wave by an amount corresponding to the decrement thereof, recombining said portions, and varying the weight of said trace in accordance with variations of the combined waves.

6. Apparatus for displaying geophysical data comprising a display surface, means for tracing on said surface a family of quasi-circular paths, the radii of successive paths differing incrementally, means for varying the increments in radius of successive paths to correspond to scale to successive loci of possible surfaces in a geological mass which would reflect seismic waves from a shot-point to a geophone in known geometrical position with respect to said shot-point at successive intervals following the initiation of such waves at said shot-point, and means for varying the relative intensity of successive traces in accordance with waves originating at said shot-point and received at said geophone at corresponding intervals.

7. Apparatus in accordance with claim 6 including means for varying the centers of curvature of said successive paths in accordance with variations in the form of said loci caused by varying parameters in said geological mass.

8. Apparatus for displaying geophysical data comprising a plurality of input circuits for electric waves corresponding to seismic waves received at a plurality of positions over a geological mass, a branch circuit connected across each of said input circuits, a delay circuit in said branch for retarding a portion of the wave carried thereby for one-half of its fundamental period, a summing device connected to each of said input circuits and to the branch circuit derived therefrom for adding the delayed and undelayed portions of said wave, a display surface, means for tracing on said surface arcuate paths corresponding to scale, to loci of reflection of said seismic waves as received at a plurality of locations over said mass at successive intervals, and means for varying the relative intensity of successive traces thus formed with the combined portions of said electrical waves.

9. Apparatus for displaying geophysical data comprising a cathode ray tube having a modulating grid, means for deflecting a beam of cathode rays and a screen for displaying the trace of said beam thereon, a generator of oscillations of a frequency high in comparison with the major frequencies of seismic waves, circuits for deriving sine and cosine components of the output of said generator, circuits connected to apply said sine and cosine components to said deflecting means, means for modulating said components to deflect said ray in arcuate paths of expanding radius, means for introducing arbitrary variations in the rate of expansion of radius between successive paths, a translating device for generating electrical waves corresponding in form to seismic waves, and connections from said translating device to said modulating grid.

10. Apparatus in accordance with claim 9 including means for accentuating the initial impulses of said electrical waves in comparison with a following wave train.

References Cited in the file of this patent

UNITED STATES PATENTS

| Number | Name | Date |
|---|---|---|
| 2,183,634 | Zworkin | Dec. 19, 1939 |
| 2,209,191 | Dearing | July 23, 1940 |
| 2,403,967 | Busignies | July 16, 1946 |
| 2,408,040 | Busignies | Sept. 24, 1946 |
| 2,408,414 | Donaldson | Oct. 1, 1946 |
| 2,422,100 | Huff | June 10, 1947 |
| 2,436,827 | Richardson | Mar. 2, 1948 |